United States Patent [19]

Altermatt et al.

[11] Patent Number: 4,861,947
[45] Date of Patent: Aug. 29, 1989

[54] COMMUNICATION OR CONTROL CABLE WITH SUPPORTING ELEMENT

[75] Inventors: Ernst Altermatt, Nunningen; Peter Heim, Breitenbach, both of Switzerland

[73] Assignee: Schweizerische Isola-Werke, Breitenbach, Switzerland

[21] Appl. No.: 180,898

[22] Filed: Apr. 13, 1988

[30] Foreign Application Priority Data

Apr. 13, 1987 [CH] Switzerland .................... 1423/87

[51] Int. Cl.⁴ .................... H01B 5/10; H01B 7/08
[52] U.S. Cl. .................... 174/113 C; 174/117 F; 174/131 A; 350/96.23
[58] Field of Search ............ 174/70 A, 113 C, 131 A, 174/117 F; 350/96.23

[56] References Cited

U.S. PATENT DOCUMENTS

| | | | |
|---|---|---|---|
| 3,717,720 | 2/1973 | Snellman | 174/131 A |
| 3,980,808 | 9/1976 | Kikuchi et al. | 174/131 A X |
| 4,097,686 | 6/1978 | Gladenbeck et al. | 174/113 C X |
| 4,143,943 | 3/1979 | Anderson | 174/117 F |
| 4,317,000 | 2/1982 | Ferer | 350/96.23 |
| 4,449,012 | 5/1984 | Voser | 174/131 A X |
| 4,629,286 | 12/1986 | Fuse et al. | 350/96.23 |
| 4,688,888 | 8/1987 | Kimmich | 350/96.23 |
| 4,723,831 | 2/1988 | Johnson et al. | 350/96.23 |

FOREIGN PATENT DOCUMENTS

| | | | |
|---|---|---|---|
| 1024228 | 7/1975 | Canada | 174/70 A |
| 1004253 | 3/1957 | Fed. Rep. of Germany | 174/117 F |
| 2330673 | 12/1974 | Fed. Rep. of Germany | 174/117 F |
| 3516708 | 11/1986 | Fed. Rep. of Germany | 174/117 F |
| 111684 | 9/1975 | Japan | 174/117 F |
| 838494 | 6/1960 | United Kingdom | 174/131 A |

*Primary Examiner*—Morris H. Nimmo
*Attorney, Agent, or Firm*—Wenderoth, Lind & Ponack

[57] ABSTRACT

A communication or control cable having one or more supporting elements made of
(a) high-molecular weight reinforcing fibers or filaments having a modulus of elasticity > 100 GPa, which are firmly joined to one another by means of
(b) a high-molecular weight, crosslinked resin.

11 Claims, 2 Drawing Sheets

COMMUNICATION OR CONTROL CABLE WITH SUPPORTING ELEMENT

BACKGROUND OF THE INVENTION

Until now it was usual to improve the breaking strength of cable, predominantly of cables having small cross-sections, and thus their mechanical properties, by the insertion of reinforcing fibers, for example in the form of threads, filaments or yarns. This procedure has the disadvantage that individual reinforcing elements fray during further processing, for example during splicing of the cables, so that a continuous fabrication of the cables is not possible with all production methods.

SUMMARY OF THE INVENTION

It has now been found that the breaking strength of such reinforcing elements can be increased by wetting them with suitable resins and crosslinking the resins at elevated temperature. The breaking strength is understood to be the strength measured in a tensile test immediately before the complete separation of a sample.

The invention thus relates to a communication or control cable with supporting element, wherein the supporting element is made up of high-molecular weight reinforcing fibers or filaments having a modulus of elasticity >100 GPa, which are firmly joined to one another by means of a high-molecular weight, crosslinked resin.

DESCRIPTION OF PREFERRED EMBODIMENTS

Figure 1:
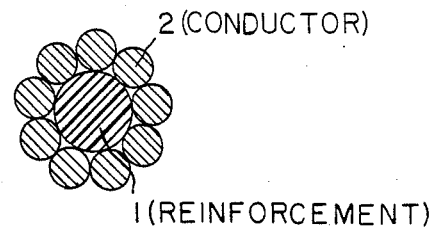
FIGS. 1–3, 3a and 4–6 all show various embodiments of cables of the present invention, more specifically, showing the various manners in which the supporting elements can be incorporated in the cables.

The reinforcing fibers or filaments may take the form of parallel and/or twisted fibers or filaments, yarns or braidings. They may be super strong plastic filaments (high-modulus filaments), preferably of aromatic polyamides (aramide filaments), such as for example the brand products Kevlar and Arenka, or inorganic fibers, preferably of carbon, such as for example graphite fibers or C whiskers. The following table shows various properties of fibers having a modulus of elasticity >100 GPa:

| Fiber | Density in g/cm$^3$ | Tensile strength in MPa | Modulus of elasticity in GPa | Specific modulus of elasticity in N·cm·g$^{-2}$ |
|---|---|---|---|---|
| Kevlar 49 | 1.45 | 2760 | 138 | 951 |
| Arenka HM | 1.45 | 2700 | 125 | 862 |
| Graphite A-S[1] | 1.75 | 2820 | 208 | 1189 |
| Graphite HT-S[1] | 1.77 | 2820 | 234–253 | 1322–1429 |
| Graphite HM-S[1] | 1.91 | 2340 | 345–375 | 1806–1963 |
| Graphite UHMS[1] | 1.96 | 1860 | 485–517 | 2474–2638 |
| Boron[2] | 2.65 | 3410 | 386 | 1457 |
| Beryllium | 1.83 | 350 | 320 | 1749 |
| Steel, drawn | 7.75 | 2600 | 210 | 270 |
| Whiskers | | | | |
| Si | — | — | 159 | — |
| C | 1.9 | 20000 | 1034 | 5442 |
| Fe | 7.8 | 13000 | 200 | 256 |
| zircon | — | — | 427 | — |

[1]A = high-strain/Low modulus,
HT = high-tensile,
HM = high-modulus,
UHM = ultra-high-modulus,
S = surface treated.
[2]With tungsten core.

The high-molecular weight, crosslinked resin is preferably a polymer blend of polyurethane resin and phenoxy resin. The polyurethane resin may contain amide and/or imide groups. It is preferably linear or branched. The phenoxy resin preferably has a molecular weight >30,000.

The uncrosslinked polyurethane resin may, for example, be prepared in a known way from the following starting materials:

A.
 262.5 parts by weight triethylene glycol
 130.5 parts by weight tris-(hydroxyethyl)-isocyanurate
 112.5 parts by weight glycoll
 288 parts by weight trimellitic anhydride 250 parts by weight p,p'-diphenylmethane diisocyanate
 This polymer resin contains imide groups B.
 240 parts by weight N-methyl pyrrolidone
 150 parts by weight triethylene glycol
 250 parts by weight p,p'-diphenylmethane diisocyanate C.
 62 parts by weight ethylene glycol
 210 parts by weight trimethyl hexamethylene diisocyanate D.
 106 parts by weight diethylene glycol
 210 parts by weight trimethyl hexamethylene diisocyanate
 130 parts by weight N-methyl pyrrolidone Examples which come into consideration as uncrosslinked phenoxy resins are the brand products Epikote 1401, Epikote 1402, Eponol 55-L-32 and Eponol 53-L-32 from Shell and the brand product Phenoxy Resin PKHH (Union Carbide).

The polymer blend expediently contains 10 to 80% by weight of polyurethane resin and 90 to 20% by weight of phenoxy resin, preferably 30 to 60% by weight of polyurethane resin and 70 to 40% by weight of phenoxy resin.

No phenols may be used in the preparation and application of the resins as blocking agents or solvents. Low and medium boiling solvents, such as glycol ethers, glycol esters, aromatic hydrocarbons, also alcohols, dimethyl formamide or methylene chloride or mixtures thereof are suitable for application of the polymer blends on the reinforcing fibers or filaments. The extensibility of the reinforcing element is reduced and the breaking strength increased by the high-molecular weight, crosslinked resin.

In order to adapt the breaking strength of the supporting element according to the invention to the respective requirements, several reinforcing threads or filaments and/or several reinforcing yarns may be laid in parallel, impregnated with a solution of the starting materials for the high-molecular weight, crosslinked resin in a suitable solvent, and thermally crosslinked, so that they are united into a uniform supporting element. Individual reinforcing threads or filaments and/or individual reinforcing yarns may also be stranded into a unit and this unit impregnated and crosslinked as described. The stranding may be carried out by S twisting, Z twisting or SZ twisting and/or as braiding.

In the case of thin conductors or cables, it is also possible for reinforcing threads to be stranded around or with or braided around the conductors or cable, and the structure thereby obtained impregnated and crosslinked in the way described above.

Furthermore, supporting elements may also be braided with one another or with conductors or cables.

The supporting elements according to the invention may be used in particular for the mechanical reinforcement of communication, remote control and/or light guide cables as well as special-purpose cables.

The supporting elements may be incorporated in the cables in various ways. FIGS. 1 to 3, 3a and 4 to 6 show several embodiments of cables according to the invention.

FIG. 1 shows a supporting element which, as central element, is stranded with several conductors 2.

Figure 2:
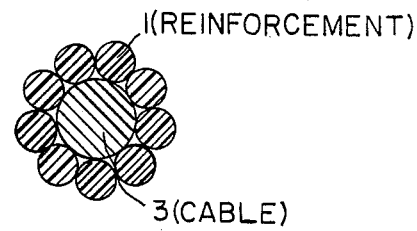

FIG. 2 shows a conductor or a cable 3 as central element which is stranded with a layer of several supporting elements 1, classically or by SZ twisting.

Figure 3:
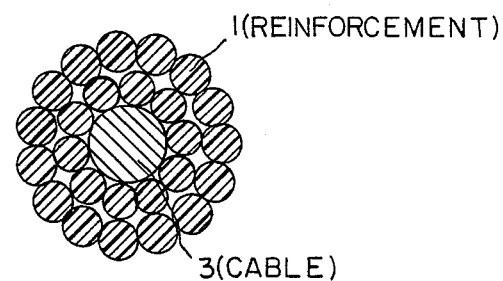

FIG. 3 likewise shows a conductor or a cable 3 as central element which is stranded with several layers of several supporting elements 1, classically or oppositely or by SZ twisting.

Figure 3A:
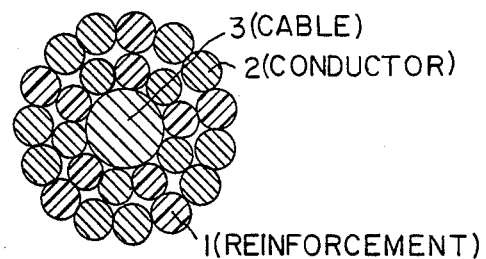

FIG. 3a likewise shows a conductor or a cable 3 as central element which is stranded with several layers of several supporting elements 1 and several conductors 2, classically or oppositely or by SZ twisting.

Figure 4:
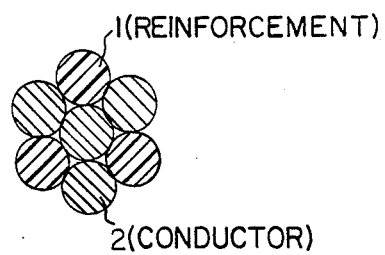

FIG. 4 shows several bare or insulated conductors 2 which are stranded with several supporting elements 1.

Figure 5:
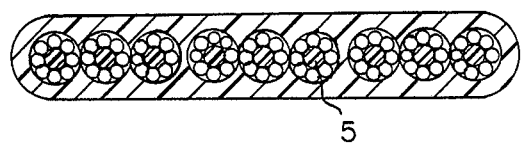

FIG. 5 shows a flat cable in which several elements 5, which may be designed in accordance with one of FIGS. 1 to 4, are embedded in a plastic sheath, preferably a flame-retardant insulation, for example PVC.

Figure 6:
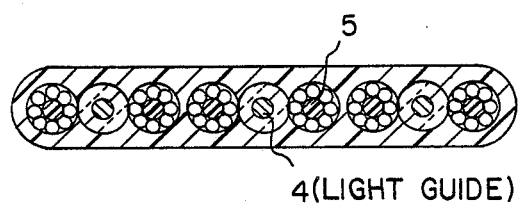

FIG. 6 shows a different flat cable, in which several elements 5 and several light guides 4 are embedded in a plastic sheath, preferably a flame-retardant insulation, for example PVC.

We claim:

1. In a communication or control cable comprising a supporting element made of high-molecular weight reinforcing fibers or filaments having a modulus of elasticity greater than 100 GPa, which are firmly joined to one another by means of a high-molecular weight, crosslinked resin, the improvement wherein the high-molecular weight, crosslinked resin is a polymer blend of polyurethane resin and phenoxy resin.

2. The cable as defined in claim 1, wherein the polyurethane resin contains amide and/or imide groups.

3. The cable as defined in claim 1, wherein the polyurethane resin is linear or branched.

4. The cable as defined in claim 1, wherein the phenoxy resin has a molecular weight greater than 30,000.

5. The cable as defined in claim 1, wherein the polymer blend contains 10 to 80% by weight of polyurethane resin, the remainder being phenoxy resin.

6. The cable as defined in claim 5, wherein the polymer blend contains 30 to 60% by weight of polyurethane resin, the remainder being phenoxy resin.

7. The cable as defined in claim 1, wherein the reinforcing fibers or filaments are in the form of parallel and/or twisted fibers or filaments or of yarns or braidings.

8. The cable as defined in claim 1, wherein the reinforcing filaments are super strong synthetic filaments.

9. The cable as defined in claim 8, wherein the reinforcing filaments are made of aromatic polyamides.

10. The cable as defined in claim 1, wherein the reinforcing fibers are inorganic fibers.

11. The cable as defined in claim 10, wherein the reinforcing fibers are carbon fibers.

* * * * *